June 26, 1951

H. L. MULLER ET AL 2,558,495

REGULATION OF THE AMOUNT OF AIR IN THE
CYCLE OF AN EXTERNAL-COMBUSTION ENGINE

Filed Jan. 21, 1948

H.L. MULLER & W.K. BOUWMAN
INVENTORS

BY Fred M. Vogel
AGENT

June 26, 1951
H. L. MULLER ET AL
2,558,495
REGULATION OF THE AMOUNT OF AIR IN THE
CYCLE OF AN EXTERNAL-COMBUSTION ENGINE
Filed Jan. 21, 1948
2 Sheets-Sheet 2
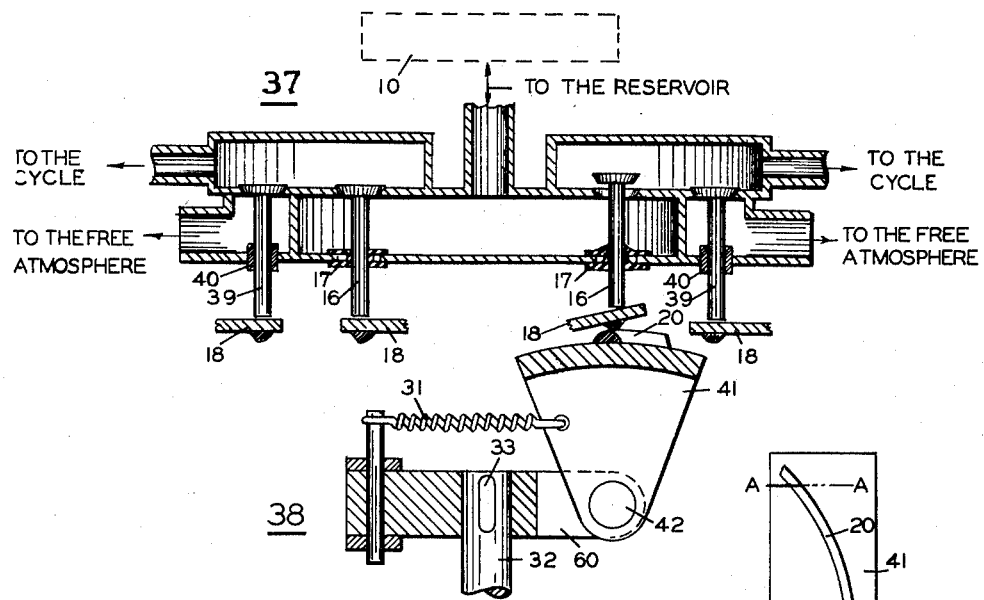
FIG. 3
FIG. 3a
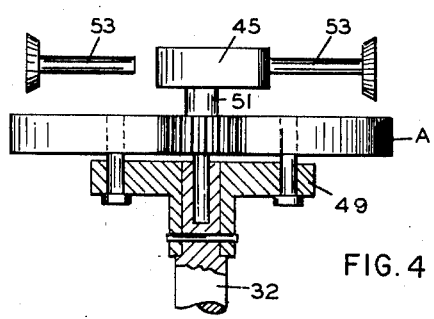
FIG. 4
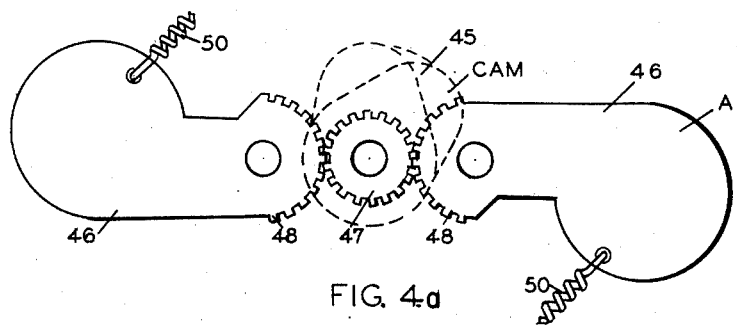
FIG. 4a
H.L.MULLER & W.K.BOUWMAN
INVENTORS
BY *Fred M. Vogel*
AGENT Patented June 26, 1951

2,558,495

UNITED STATES PATENT OFFICE 2,558,495

REGULATION OF THE AMOUNT OF AIR IN THE CYCLE OF AN EXTERNAL-COMBUSTION ENGINE

Hendrik L. Muller, Tarrytown, and Wicher K. Bouwman, Harmon on Hudson, N. Y., assignors to Philips Laboratories, Inc., Irvington on Hudson, N. Y.

Application January 21, 1948, Serial No. 3,398

11 Claims. (Cl. 60—24)

This invention relates to power control devices or systems and apparatus for a hot-gas engine.

Generally speaking this invention contemplates submitting the working cylinder or cylinder means to auxiliary engine-medium source means cyclically when the engine load or speed reaches a predetermined amount and the timing of the resultant control per cycle is varied dependent on whether the load or speed of the engine is presistent in its change. This effect is produced by connecting the cylinder means to a pressurized source of liquid or gas depending upon the engine medium and/or the atmosphere through a governor system acting cyclically upon valves in a valving system interposed between the cylinder means and the auxiliary sources. This governor system includes a centrifugal governor-actuated cam designed in accordance with a widening area of contact with the valves for increases of engine speed beyond a predetermined amount and with a curve dependent on the angle of governor swing. When the auxiliary or augmenting source means comprises either a two or more pressure level source or like volume source, both of which may or may not include the atmosphere, this same cam may be so correlated with a second or another set of valves in the valving system that a greater engine influencing pressure or volume source of the broadly conceived source than that already delineated may be brought into play upon the load reaching an upper limit beyond the load conditions already considered. In accordance with the concepts of the present invention the governor system may be arranged for either a horizontal or vertical engine driven means, and, therefore, the valving system is built to accommodate the governor arrangement. Both arrangements are described in this invention. However, the applicants do not wish to limit their invention by such precepts based on mere design problems for a particular installation. In this connection, it is recognized that a radial arrangement of cylinder means in a hot-gas engine has decided thermal and structural advantages and, therefore, the inventors have included an extra embodiment of their power control for the same to demonstrate the feasible uses of their invention.

In accordance with another embodiment of the invention the full pressure of a pressurized chamber or the atmosphere is suddenly applied to all working cylinder means in a multicycle engine on a strictly simultaneous basis when the load reaches the last mentioned upper limit.

In order to produce such a result the applicants have conceived a structure similar to that already delineated but incorporating a second cam so positioned in the governor system and correlated with the first cam that when the limit of its contact with the valves is reached the second cam takes over the engine control. This is made possible by interposing an intermediate contacting plate between all the valves and the second cam, the plate being held out of contact with these valves by a spring and plunger arrangement until the last named engine condition is acquired.

Therefore, it is obvious that the applicants have conceived novel means for controlling an external combustion engine or hot-gas engine.

A principal feature of this invention is the attainment of proper hot-gas engine control during substantially all conditions to which the engine may ordinarily be submitted without an appreciable loss of engine efficiency when compared with that previously reached.

A primary object of this invention is to provide a compound power control for a hot-gas engine operating under the combined conditions of slow, small, rapid and large load changes thereto.

Another primary object of this invention is to provide apparatus to overcome all the above problems.

The invention in another of its aspects, relates to novel features of the instrumentalities described herein for achieving the principal objects of the invention and to novel principles employed in those instrumentalities whether or not these features and principles are used for the said principal objects or in the said field.

A further object of the invention is to provide improved apparatus and instrumentalities embodying novel features and principles, adapted for use in realizing the above objects and also adapted for use in other fields.

In the drawing:

Fig. 3 is a vertical longitudinal section view of another embodiment of the invention.

Fig. 3a is a plan view of the governor piece utilized in the embodiment of Fig. 3.

Fig. 4 is a vertical longitudinal section view of still another embodiment of the invention when power control for a radial engine is contemplated.

Fig. 4a is a plan view of the device of Fig. 4, but with the valves and cam operator removed, several of the possible positions of the cam operator being shown in dotted lines.

Figure 1:
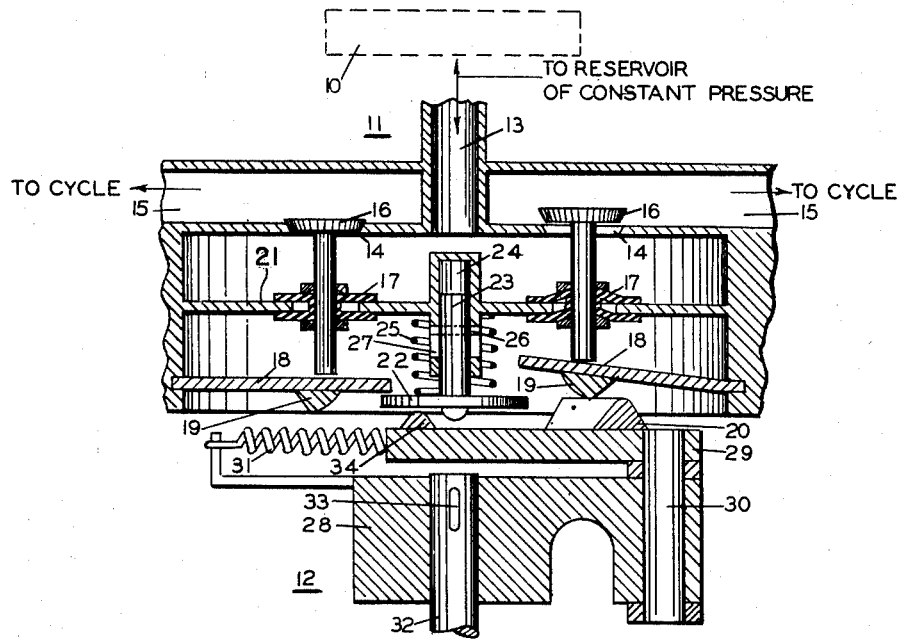
Fig. 1 is a vertical longitudinal section view of one embodiment of the invention.
Figure 2:
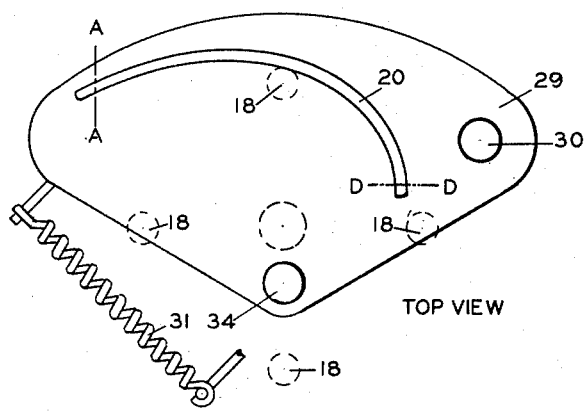
Fig. 2 is a plan view of the governor system including the same for the Fig. 1 embodiment.

In Fig. 1 an air reservoir 10 of constant pressure is connected to a flow control system of means 11, said system being actuated by governor control means 12. Air is passed from reservoir 10 by means of passageway 13 through a plurality of valve controlled ports 14 and onward to the respective cylinders by means of passageways 15.

The air control system 11 is comprised of a casting which is arranged to contain a plurality of port valves 16, associated with spring levers 18, and a table plate support means 21. The port valves 16 consist of a port sealing head attached to a stem the stem passing through and fixed to a sealing disphragm 17 in an airtight manner, the valves 16 being guided by suitable guiding means and held in closed position by spring or equivalent means (not shown). Port valves 16 are lifted by the action of spring levers 18, which have a protrusion 19 on a lower side and are fixed at one end to an adjacent part of the engine proper. The spring levers can be forced from neutral position by action of a cam surface 20 in one instance and by the combination of a table plate 22 supported on the support means 21 and a cam 34. The table plate support means 21 is located above the spring levers 18 as viewed in Fig. 1 and support a table plate or disc 22, which is secured to the lower end of shaft 23, the other end of the shaft being freely fitted to move in a reciprocal manner in a shaft guide 24 mounted on the support means 21. Spring 25 retains table plate 22 in a neutral position, while pin 26, which is secured to said shaft, acts as a stop to limit maximum upward and downward travel of the table plate by abutting ends of slots 27 as shown.

The governor control means 12 is comprised of a base casting 28, an eccentric cam table 29, a cam table shaft 30, and a spring 31 which is secured to the cam table 29 at one end, and to the base casting 28 at the other end. The automatic control means is positioned beneath the air control system 11 so that the center line of shaft 32 is approximately in line with the center line of table plate 22, and at such a distance that cam protrusions 20 and 34 can engage spring lever protrusions 19 and table plate 22 at predetermined positions in relation to engine speed. The base casting 28 is fixed to the ends of an auxiliary engine shaft 32 by means of key 33. Cam table shaft 30 is located in the base casting 28 parallel to shaft 32, and is affixed thereto in a smooth fitting manner to provide easy rotation therein. Cam table 29 is an elliptical shaped plate having two cam protrusions on its upper side which are arranged to provide the required cam action. Cam protrusion 34 is used to engage and act upon table plate 22 while cam protrusion 20 is a curved narrow ridge increasing in width from section A—A to D—D and is of a predetermined angular length, the locus of the curved ridge being such as to produce the required valve action in relation to engine speed when successively engaged with valve spring levers 18. The cam table 29 is fixed at one lobe to shaft 30 and moves in a plane perpendicular to shaft 32. At the cam table lobe opposite to that which is secured to shaft 30, is fastened spring 31, the other end of the spring being secured to base casting 28 as shown.

When engine shaft 32 revolves at low speed in a clockwise direction, as seen from top view of the cam table 29, part A—A of cam protrusion 20 will successively contact the spring levers 18 at a time when the pressure in the system is minimum, allowing the addition of air to the system, thus, resulting in a relatively large engine torque. As the rotational speed increases this contact will be shifted toward part D—D of cam protrusion 20, since the centrifugal force developed will overbalance the resistance of spring 31 resulting in a movement of cam table 29 in a clockwise direction. This will result in the port valve 16 being open a time during the period when the pressure in the cylinder is higher, hence, a decreasing amount of air due to the relief action will be involved in the process affecting a decrease in engine torque. If this reduction is insufficient with regard to the small load on the engine, the subsequent increase in speed will bring cam 34 into contact with table plate 22, and all of the valves will be simultaneously opened allowing air in the cycle to return to reservoir 10 resulting in a quick drop in power which produces a lowering of engine speed.

Fig. 3 illustrates another method for regulating the engine speed. It is seen that the air control system is comprised of a plurality of valves 16 and 39 arranged in pairs which are placed in a casting in a manner to provide port valve sealing means, valve 16 being fixed to the diaphragm 17, while valve 39 rides in a valve guide 40, both valves being acted on by the spring levers 18 which are fixed at one end as described heretofore. The spring levers 18 are arranged to be forced upward from a neutral position when contacted by the narrow ridged cam 20 which is located on top of a governor piece 41 as seen in Fig. 3a. The governor piece 41 which moves in a vertical plane is pivoted by means of pin 42, to a base 60 which is fixed by a key 33, to a shaft 32 and the governor piece 41 is retained by means of the attached spring 31, the other end of the spring being fixed to the base 60 as shown heretofore.

A study of Fig. 3 and 3a shows that in slow speed operation the automatic control means 38 revolves in a clockwise direction as seen from a top view of the automatic control means 38, producing successive contacts between part A—A of cam protrusion 20, and spring levers 18, at a time when the pressure in the system is minimum, thus, resulting in maximum engine torque. As the rotational speed increases this contact will be shifted toward part D—D of cam protrusion 20, since the centrifugal force developed will overbalance the resistance of spring 31 resulting in the movement of governor piece 41 in an outward direction. This will result in the port valves 16 being opened at a time when the pressure in the system is at a maximum, hence, a decrease in the amount of air will be involved in the process affecting a decrease in the engine torque. If this reduction is insufficient with respect to the small load on the engine, the subsequent increase in speed will bring cam 20 in successive contact with valves 39, which would open the system to the atmosphere producing a quick drop in power, resulting in the desired lowering of engine speed.

Figs. 4 and 4a illustrate another device for controlling the engine speed as applied to an engine with radially placed valves. A cam 45 is coupled to governor elements 46 by means of a pinion 47 and sector racks 48, the governor elements 46 being affixed to shaft 32 by means of base 49, and held in neutral position by springs 50 as shown. A lever means 51 is affixed to the governor elements 46, and arranged to operate an auxiliary cam 45 at a predetermined moment.

It can be seen that when shaft 32 revolves in a clockwise direction, rotary motion is transmitted to cam 45 and valves 53 are thus successively operated upon. As rotational speed increases the cam position is changed by virtue of action of the gear means which respond to centrifugal forces, thereby effecting a change in valve opening time. At maximum speed the centrifugal force developed produces a maximum throw of the governor elements 46, resulting in the simultaneous operation of all valves 53 by action of auxiliary cam 45, which has been forced to operating position by lever means 51.

What we claim is:

1. In combination; a hot-gas engine comprising at least one working cylinder means, and a power control for said engine comprising; an augmenting gas source, means including valve means interposed between said source and said cylinder means, driven means coupled to said engine, governor means coupled to said driven means, cam means actuable by said governor means for opening said valve means cyclically upon said driven means being driven by said engine.

2. In combination; a hot-gas engine comprising cylinder means, and a power control for said engine comprising; two supplementary engine gas sources each having a different pressure, means including valves for selectively coupling said sources to said cylinder means, driven means coupled to said engine, governor means coupled to said driven means, cam means coupled to said governor means responsive to engine speed changes for motivating said selective valves so that one of said gas sources is selected at a different speed of said engine than is the other of said gas sources.

3. In combination; a hot-gas engine including cylinder means, and a power control for said engine comprising; auxiliary engine-medium source means with at least two pressure levels, means including radial valves for selectively coupling one of said source means to said cylinder means, driven means coupled to said engine, governor means including two spring retained and vertically pivoted symmetrical elements with opposed sector gears coupled to said driven means, pivotal cam means for actuating said valves sequentially and cyclically, and gear means coupled to said cam means interposed between said sector gears for movement thereby, whereby the timing of the sequential and cyclic actuation of said radial valves is varied in accordance with engine speed changes.

4. In combination; a hot-gas engine comprising a working cylinder system and a drive shaft, and a power control for said engine comprising; an auxiliary engine-medium source means coupled to said system, an engine-medium flow control means including valves, intermediate valve contacting means for opening and closing said valves, said flow control means being interposed between said cylinder system and said auxiliary source means, a centrifugal governor means in positive association with said drive shaft, said governor means including a cam means for cyclically actuating said intermediate valve control means at a predetermined engine speed, and said cam means including means for causing continuous actuation of said intermediate valve controlling means at another predetermined engine speed.

5. In combination; a hot-gas engine comprising a working cylinder system and a power control for said engine comprising; an augmenting gas source, means including valve means interposed between said source and said cylinder means, driven means coupled to said engine, centrifugal governor means coupled to said driven means, said governor means having a retaining spring to act in opposition to centrifugal forces developed by said governor means, a cam means operatively associated with said governor means for actuation thereby, said cam means being arranged to successively open said valve means at one predetermined speed and to simultaneously open said valves at a speed other than said predetermined speed.

6. In combination; a hot-gas engine including cylinder means and a drive shaft, and a power control for said engine comprising; auxiliary engine-medium source means, and engine-medium flow control means having valve means and intermediate valve operating means, said valve means being interposed between said source means and said cylinder means, centrifugal governor means in positive association with said engine drive shaft, said governor means including a cam means arranged to successively actuate said valve operating means, the position of said cam means relative to the main drive shaft being varied by said centrifugal governor in response to the rotative speed thereof.

7. In combination; a hot-gas engine including cylinder means and drive shaft, and a power control for said engine comprising; auxiliary engine-medium source means, an engine-medium flow control means having intermediate valve operating means, said flow control means being interposed between said source means and said cylinder means, a centrifugal governor means in operative association with said engine drive shaft, and guided table plate means arranged for simultaneous actuation of said valve means in one position thereof, means biasing said table plate means away from said one position, said governor means including a cam means arranged to successively actuate said valve operating means at a predetermined engine speed, and said cam means being also arranged to move said biased table plate means to said position at a speed other than said predetermined speed.

8. A power control for a hot-gas engine having at least one working cylinder means, said power control comprising; an augmenting gas pressure source, conduit means having one end thereof connected to said augmenting gas pressure source and the other end thereof adapted to be connected to said working cylinder means, valve means in said conduit means, rotatable means adapted to be driven by said engine, governor means mounted on said rotatable means, and cam means coupled to said governor means and actuatable thereby for cyclically opening said valve means.

9. A power control for a hot-gas engine having at least one working cylinder means, said power control comprising; an augmenting gas pressure source, conduit means having one end thereof connected to said augmenting gas pressure source and the other end thereof adapted to be connected to said working cylinder means, valve means in said conduit means, rotatable means adapted to be driven by said engine, governor means mounted on said rotatable means, and cam means coupled to said governor means and actuatable thereby for cyclically opening said valve means to a variable extent dependent upon theh speed of rotation of said rotatable means.

10. A power control for a hot-gas engine having at least one working cylinder means, said power control comprising; an augmenting gas pressure source, conduit means having one end thereof connected to said augmenting gas pressure source and the other end thereof adapted to be connected to said working cylinder means, valve means in said conduit means, valve controlled vent means located in said conduit means between said valve means in said conduit means and said other end thereof, rotatable means adapted to be driven by said engine, governor means mounted on said rotatable means, and cam means coupled to said governor means and actuatable thereby for cyclically opening said valve means at one predetermined speed of rotation of said rotatable means and for opening said vent means at a second predetermined speed of rotation of said rotatable means.

11. A power control for a hot-gas engine having at least one working cylinder means, said power control comprising; an augmenting gas pressure source, conduit means having one end thereof connected to said augmenting gas pressure source and the other end thereof adapted to be connected to said working cylinder means, valve means in said conduit means, rotatable means adapted to be driven by said engine, governor means mounted on said rotatable means, cam means coupled to said governor means and actuatable thereby for cyclically opening said valve means, said cam means being contoured to vary the timing of said cyclic opening of said valve means in accordance with the speed of rotation of said rotatable means.

H. L. MULLER.
W. K. BOUWMAN.

REFERENCES CITED

The following references are of record in the file of this patent:

UNITED STATES PATENTS

| Number | Name | Date |
|--------|------|------|
| 997,232 | Bowers | July 4, 1911 |
| 1,121,485 | Douglas | Dec. 15, 1914 |
| 1,348,831 | Hodges | Aug. 3, 1920 |
| 1,959,041 | Schimanek | May 15, 1934 |